Figure 13:
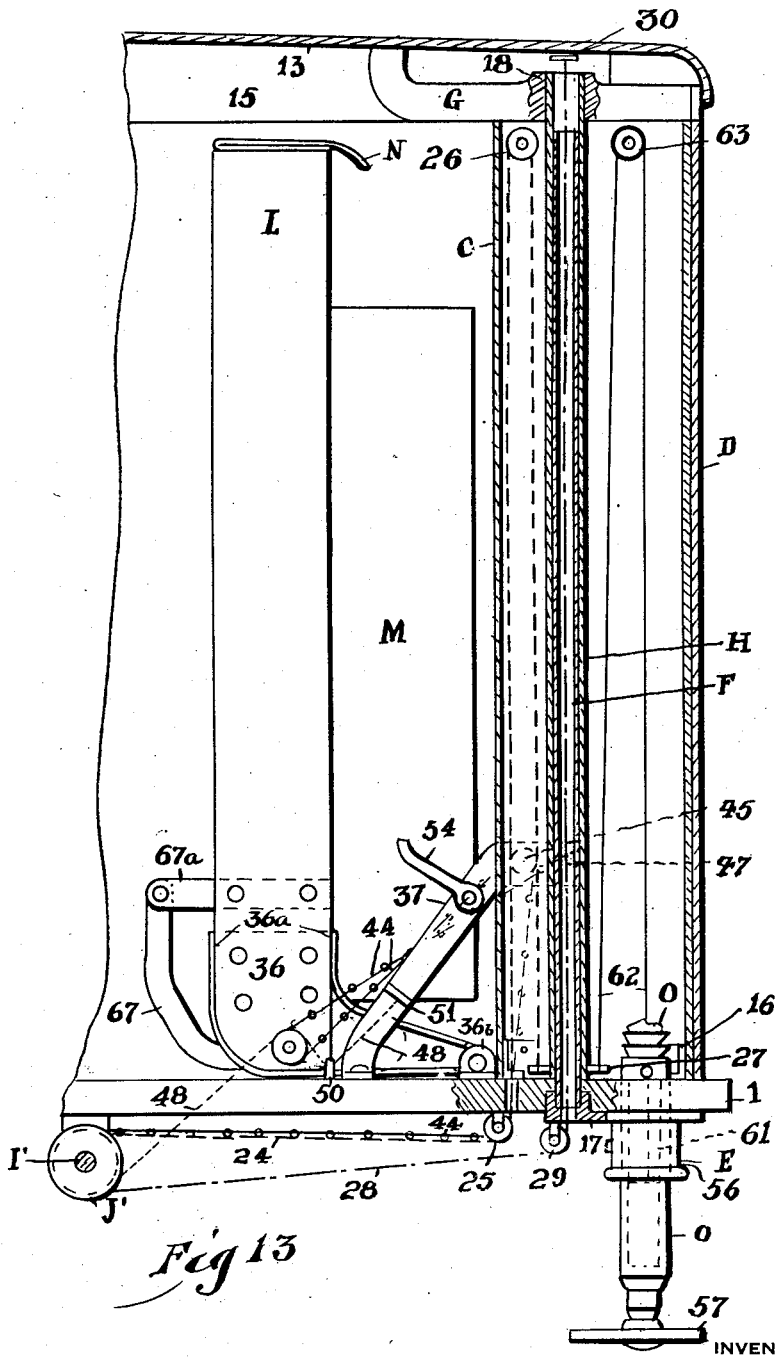

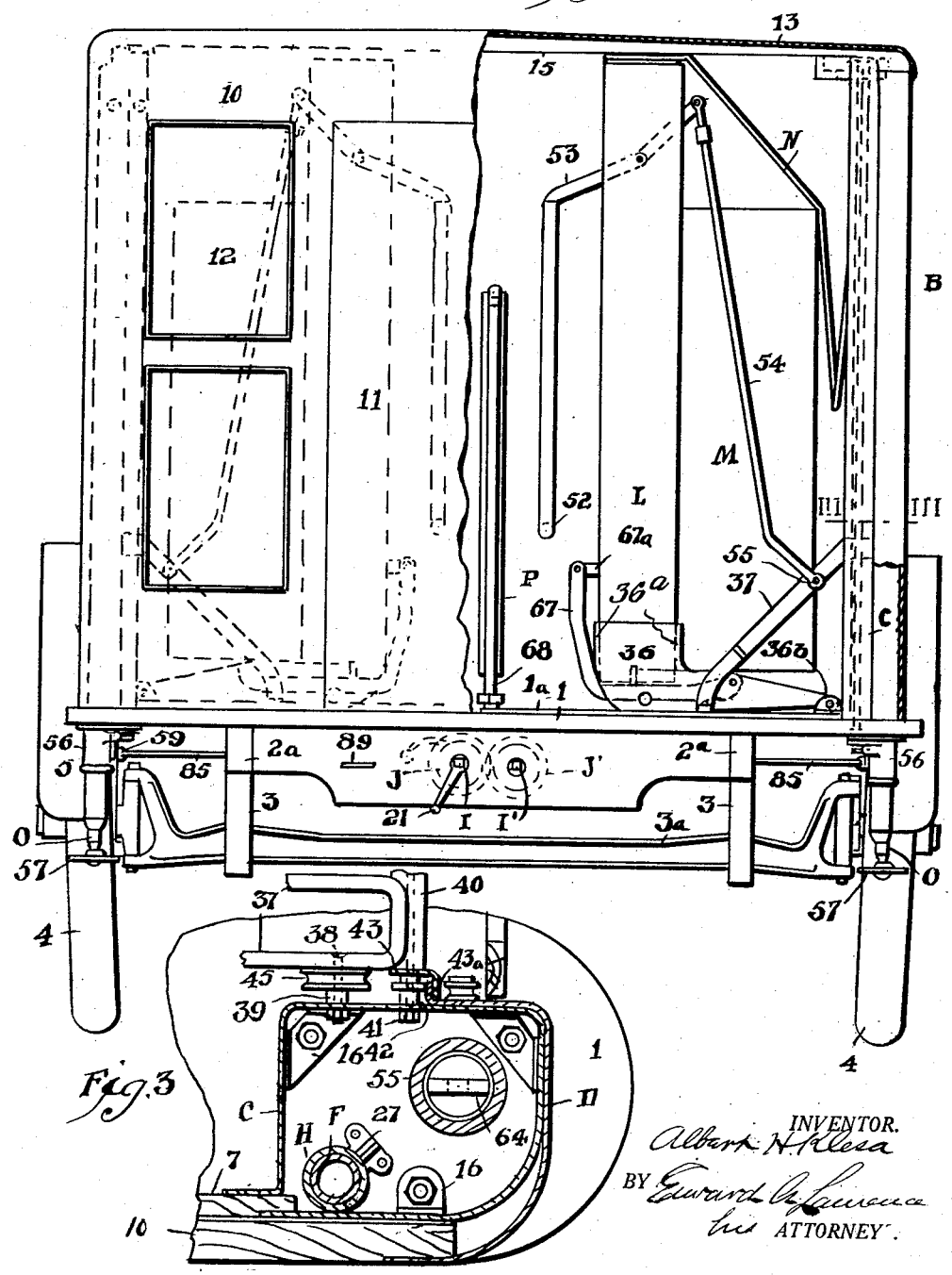

Sept. 14, 1926.
A. H. KLESA
1,599,421
VEHICLE BODY
Filed Feb. 21, 1923    7 Sheets-Sheet 2
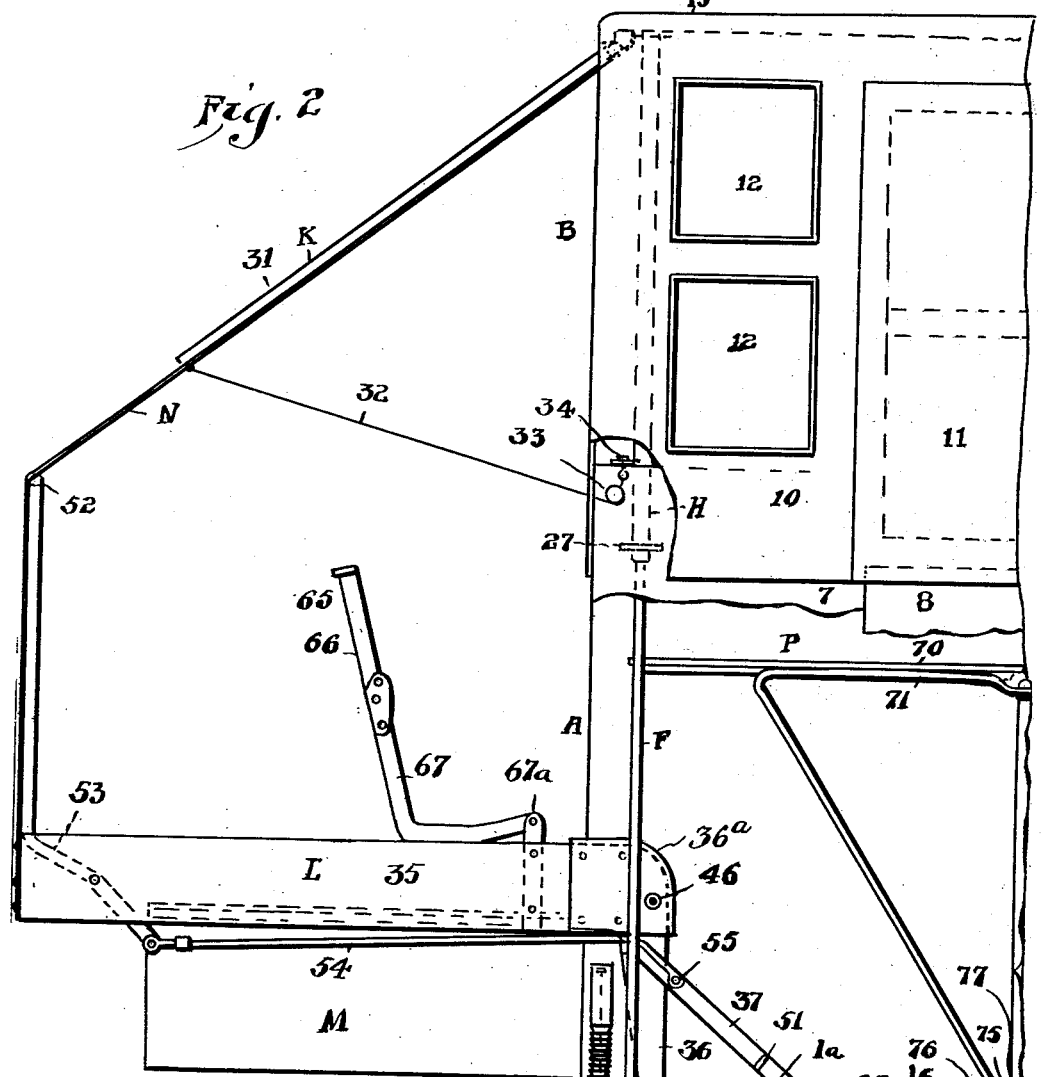
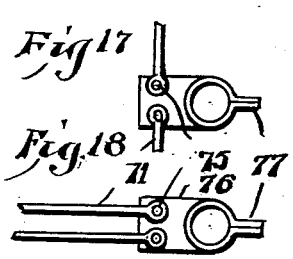
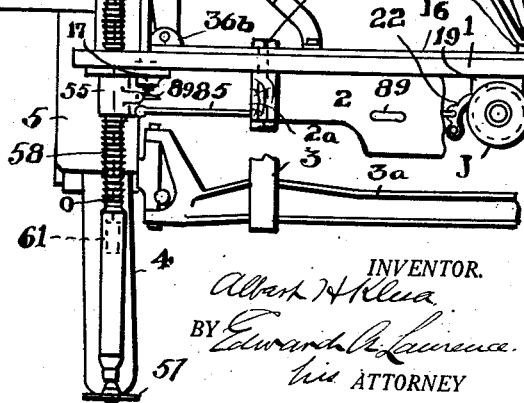

Sept. 14, 1926.  
A. H. KLESA  
1,599,421  
VEHICLE BODY  
Filed Feb. 21, 1923    7 Sheets-Sheet 3
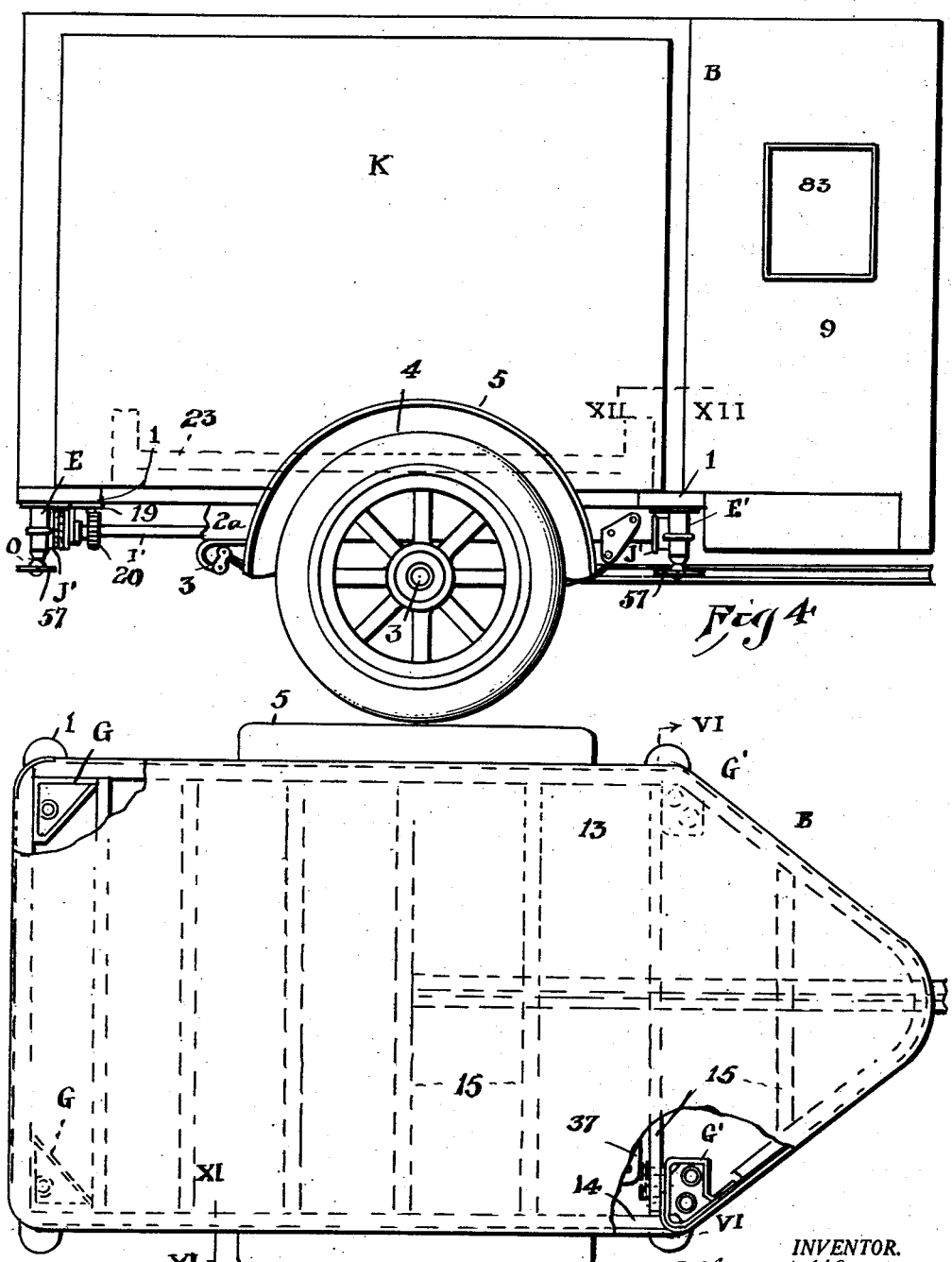

Sept. 14, 1926.
A. H. KLESA
1,599,421
VEHICLE BODY
Filed Feb. 21, 1923 7 Sheets-Sheet 4
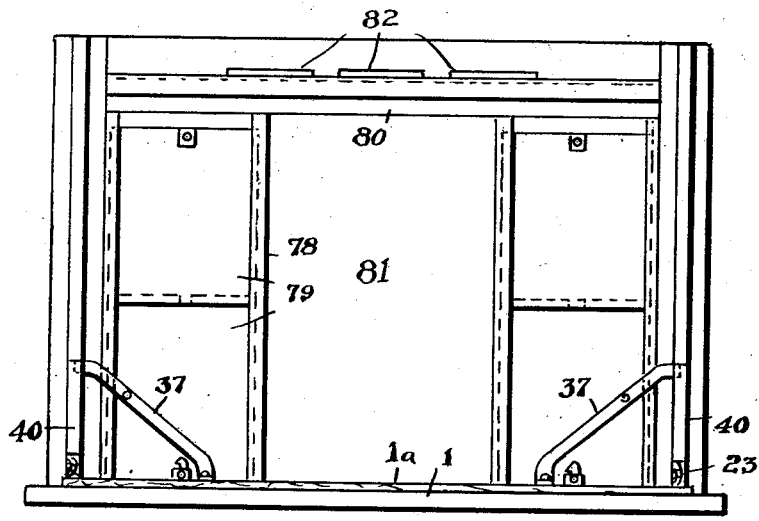
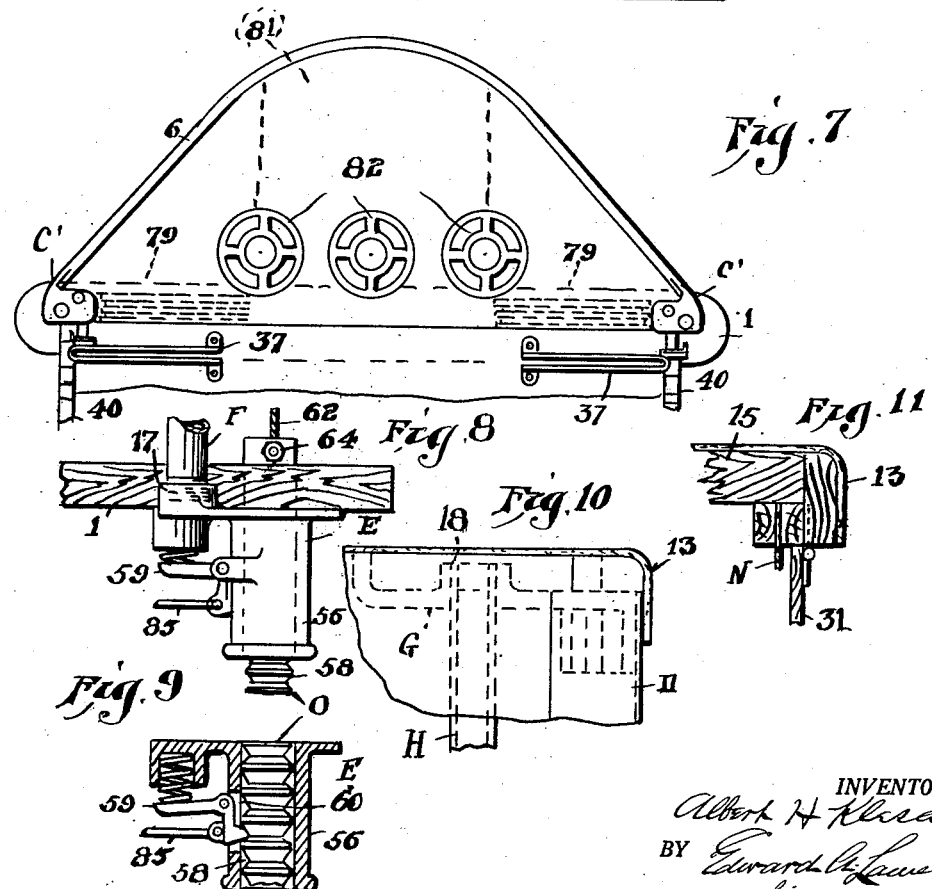

Sept. 14, 1926. 1,599,421
A. H. KLESA
VEHICLE BODY
Filed Feb. 21, 1923 7 Sheets-Sheet 5
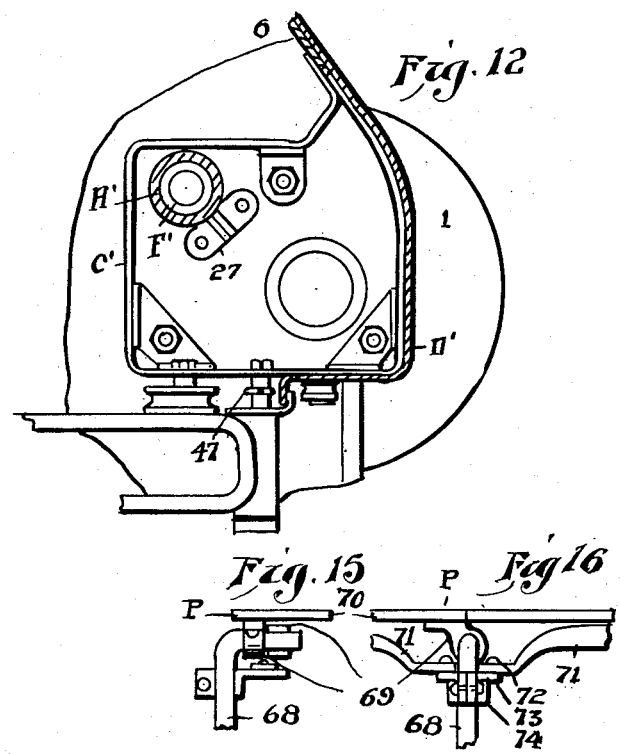
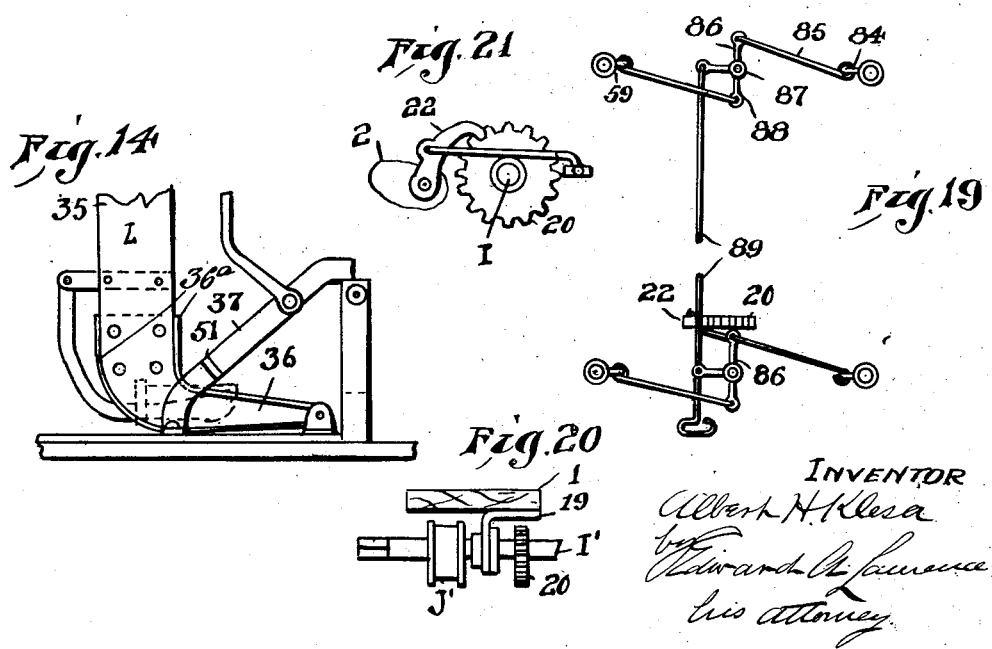

Sept. 14, 1926.

A. H. KLESA

VEHICLE BODY

Filed Feb. 21, 1923

1,599,421

7 Sheets-Sheet 6

INVENTOR
Albert H Klesa
by Edward A Lawrence
his attorney.

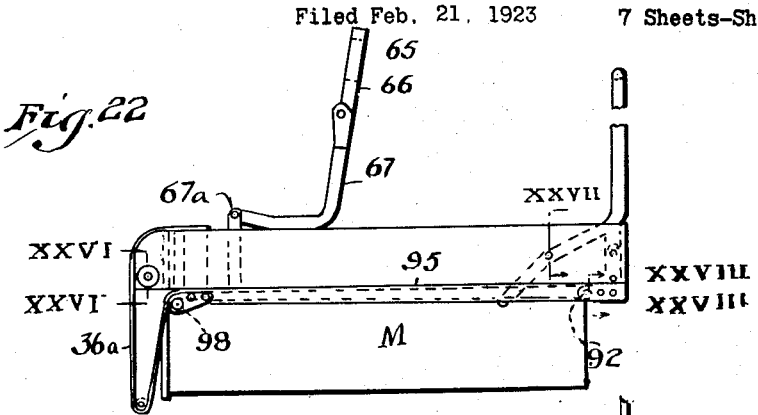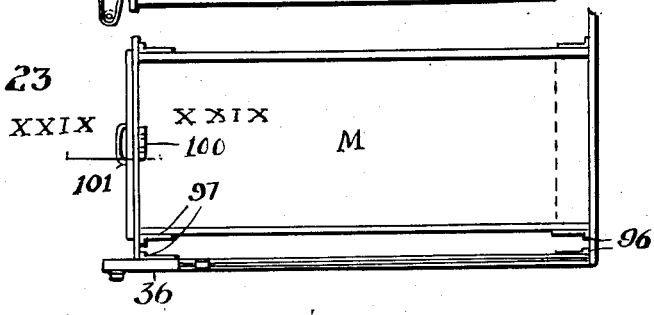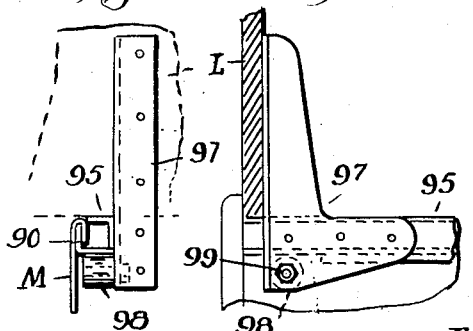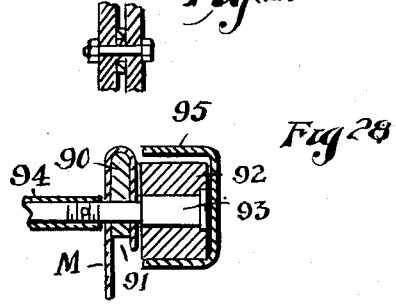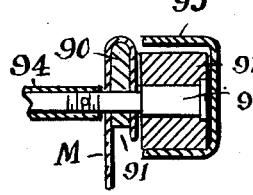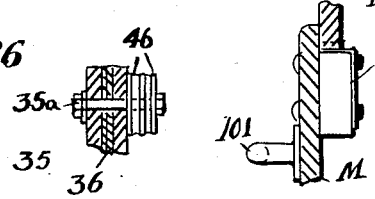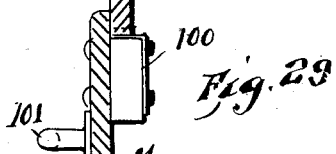

Patented Sept. 14, 1926.

1,599,421

UNITED STATES PATENT OFFICE.

ALBERT H. KLESA, OF STOW TOWNSHIP, SUMMIT COUNTY, OHIO.

VEHICLE BODY.

Application filed February 21, 1923. Serial No. 620,357.

My invention consists in a new and improved vehicle body, intended for touring, and which may be contracted into compact form for travel and be extended for occupancy when stationary.

I have illustrated my invention applied to a two-wheel trailer vehicle, intended to be drawn by a motor vehicle, but the same may be applied to a four-wheel trailer, or to the chassis of the motor vehicle itself; or, my improved body may be applied to an animal-drawn vehicle.

Generally my improved body comprises a lower or body element which is attached to the running gear, and a roofed upper or top element in telescopic relation to the lower element. When the vehicle is ready for travel the top element is telescoped down over the body element, and when the vehicle is to be arranged for occupancy, the top element is raised, thereby providing proper head room.

I provide suitable sleeping accommodations in the form of bed frames, intended to receive suitable springs, mattresses and bed clothes, and which are swingingly supported in the body element. When the body is telescoped together in compact form for travel said bed frames and their furnishings are turned up vertically within the body element; but when the body is extended for occupancy, said frames are turned out laterally into horizontal positions, protruding beyond the body lines and leaving between them a central passage way.

The front and rear ends of the body and top elements are of rigid material, and the rear ends of both elements are provided with outwardly swinging doors. When the two elements are telescoped together, these doors are in registration so that the door of the top element is opened first, and then the door of the body element is opened for access to the body. When the upper element of the body is raised, the lower portion of its door overlaps the upper portion of the door of the lower element, so that the upper door must first be opened for access to the bed.

The front portion of the body, in advance of the bed frames may be provided with cooking, refrigerating and storage accommodations.

The sides of the body, when telescoped for travel, are formed of panels hinged at their top to the roof of the top element, means being provided whereby said panels are folded down to form smooth vertical closures when the vehicle is en route, but are extended laterally to form, with canvas curtains, lateral tent-like coverings for the beds when the body is ready for occupancy. Said curtains are folded into the body when the vehicle is prepared for travel.

Means are provided whereby the body may be extended, the beds swung out and the sides raised, and the legs lowered into contact with the ground in one operation, and whereby also the beds may be swung inwardly into their vertical position, the body telescoped together, the sides folded to form vertical closures, and the legs raised in one operation.

I provide new and improved supporting jacks or legs, as a means for supporting the vehicle body solidly from the ground, when the same is ready for occupancy.

I provide storage drawers slidably mounted on the bed frames, so as to be positioned beneath the bed frames when the latter are horizontal, access being had to the drawers from the interior of the body, and the drawers being vertically disposed outside of the bed frames when the latter are turned up into their retracted positions.

I also provide a table structure which may be folded up compactly between the bed frames when the latter are retracted, but may be extended and set up for use when the bed frames are extended.

In the accompanying drawings, which are however merely intended to illustrate the principles of my invention without limiting the scope of the same to the construction shown, Fig. 1 is a rear end view of the vehicle body, the same being shown in its contracted or telescoped form, the rear walls of the telescoped body and top elements being broken away at one side of the medial line to better show the operating mechanism; Fig. 2 is a partial rear view of the same showing the upper or top element raised and the bed frames extended; Fig. 3 is an enlarged section taken along the line III—III in Fig. 1; Fig. 4 is a side elevation of the vehicle ready for travel; Fig. 5 is a top plan view of the same; Fig. 6 is a sectional view of the lower or body element section taken along the line VI—VI in Fig. 5, the upper or top element being removed; Fig. 7 is a plan view of the same; Fig. 8 is an enlarged detail showing the fitting which supports the corner post of the lower body section and the supporting leg; Fig. 9 is a detail of the same in vertical section; Fig. 10 is an enlarged detail showing the top corner construction of the upper or top element; Fig. 11 is an enlarged sectional detail taken along the line XI—XI in Fig. 5, and showing the side curtain and panel construction; Fig. 12 is an enlarged section taken along the line XII—XII in Fig. 4, showing the upper and lower casings at one of the front angles of the vertical body; Fig. 13 is an enlarged sectional view showing one of the rear corner structures and the arrangement of cables therein; Fig. 14 is an enlarged detail of the end of a bed frame showing associated elements; Figs. 15, 16, 17 and 18 are details showing the table structure; Fig. 19 is a diagrammatic view showing the release mechanism for the leg pawls; Fig. 20 is a detail showing a part of the cable winding mechanism; Fig. 21 is a detail showing means for locking the cable winding mechanism against movement; Fig. 22 is an end view of one of the bed frames, showing the back rest and one of the sliding drawers; Fig. 23 is a partial plan view of the same; Fig. 24 is a detail showing the drawer mounting; Fig. 25 is a detail looking from the right in Fig. 24; Figs. 26, 27 and 28 are details taken in section along the lines XXVI—XXVI; XXVII—XXVII, and XXVIII—XXVIII in Fig. 22, respectively, and Fig. 29 is a detail in section along the line XXIX—XXIX in Fig. 23.

The following is a detailed description of the drawings.

The vehicle body is formed of two main elements, a lower body element A, and an upper or top element B, the latter being telescoped over the former when the vehicle is made ready for travel, and raised relative thereto when the vehicle is made ready for occupancy.

The body element A is mounted on the sills 1 which are secured by bolts 1ª to the frame of the vehicle chassis of which 2 represents the cross members and 2ª the longitudinal members. 3 represents the springs, 3ª the axles, and 4 the wheels. 5 represents the mud guard. The element A is provided with a floor 1ᵇ.

The front of the body A is tapered or triangular, being formed of the vertical wall 6, while the rear of the body A has the vertical wall 7 having a central doorway with the outwardly swinging door 8.

The top element B is similarly provided with a triangular front wall 9 adapted to telescope down outside of the wall 6. The top element B is also provided with a depending rear wall 10 which is adapted to telescope down outside the wall 7 and which is centrally provided with a doorway having an outwardly swinging door 11.

When the top element B is telescoped down on the body element A, the bottom edges of the depending walls of the former rest on the sills 1 which protrude laterally for that purpose. When the top element B is elevated, the lower portions of its walls 9 and 10, and the lower portion of its door 11, overlap the upper portions of the walls 6 and 7, and of the door 8, of the body portion A. 12 represents windows or screens in the walls 10 which serve to illuminate the interior of the vehicle when the same is ready for occupancy.

The body portion A is open at the top, but the top portion B is provided with a roof of suitable material 13 mounted on side and end beams 14, and joist 15.

The rear corners of the body element A are provided with the vertically disposed metal casings C, whose cross sectional shape is shown in Fig. 3, and which are firmly anchored to the sills by the brackets 16. Said casings C extend to the top of the element A and are open at the top. The casings C are firmly anchored to the rear walls 7.

The rear corners of the top element B are provided with depending metal casings D which slide on the exteriors of the casings C, and thus aid in holding the two elements in proper alinement. The casings D are firmly attached to the walls 10, and at their upper ends to the framing of the roof.

E represents a casting, one of which is attached to the under side of the sills 1 at each rear corner of the body element A. Each of said castings is provided with a threaded socket 17 which registers with a hole extending up through the sill. F represents the tubular corner posts whose lower threaded ends are screwed firmly into said socket 17, and which extend up vertically within the casings C to the tops thereof.

The rear corners of the roof framing of the element B are strengthened by the metal corner plates G, which plates are provided with threaded sockets 18 into which are screwed the upper ends of the depending tubular corner posts H which telescope snugly down over the corner posts F. The upper and lower corner posts overlap when the top element B is raised, thus further bracing the structure, and inclosing the top lowering cables against mechanical rupture.

At the front angles of the element A the same is provided with vertically disposed casings C′, similar to casings C, and extending upwardly to the top of the wall 6, and attached thereto. I find it convenient to make the wall 6 of relatively stout sheet metal, and in such case the casings C' may be integral with said walls 6. Slidably engaging the exteriors of the casings C' are the depending casings D' of the top element B, which casings D' are rigidly anchored to the roof framing, and also to the wall 9 with which they may be integral.

At the front side angles of the body element A, castings E' are bolted to the under side of the sills, and said castings are provided with threaded sockets in which are screwed the lower threaded ends of the upwardly extending tubular corner posts F' which are enclosed in the casings C'. The upper tubular corner posts H', which telescope down over the corner posts F', have their upper threaded ends screwed into threaded sockets of the angle plates G' secured to the roof framing.

I and I' represent horizontally disposed shafts located beneath the body element A and at either side of the longitudinal center line of the same, said shafts being suitably journaled, as in the brackets 19 depending from the sills 1. Near each end, the shaft I is provided wih a cable drum J, and the shaft I' is similarly provided with cable drums J'. The two shafts are provided with intermeshing gears 20, so that they rotate in unison but in opposite directions.

I square the rear end of one or both of said shafts for the application of a crank handle 21 to provide for rotating the cable drums. The shafts are provided with locking means to prevent their accidental rotation, such as a pawl 22 pivoted to the cross member 2 of the chassis frame, and adapted to engage the teeth of one of the gears 20. The operation of the pawl 22 will be more fully described later.

24, indicated by a short dash line in Fig. 13, represents the cables for raising the top element B relative to the body element A. Four of these cables are provided, one at each corner, but the two rear cables only are shown. Thus the rear cables 24 have their ends wound about the drums J and J' in opposite direction, and thence extend up about one of a pair of coaxially journaled pulleys 25 mounted beneath the sills 1; up through holes in said sills into the interiors of the casings C; up through said casings and down over the pulleys 26 carried by the upper portions of said casings, and thence downwardly with their dead ends attached to the duplex eye brackets 27 mounted on the lower end portion of the depending post H. At the front the corresponding pair of cables similarly extend up through the casings C', down over pulleys in the upper portions of said casings, and have their dead ends attached to the lower portions of the depending posts H'.

28, shown by dash and dot line in Fig. 13, are cables for lowering the top portion B, four of the same being provided, but the rear pair only being shown. Said cables are wound upon the drums J and J' in a manner opposed to the windings of the corresponding cables 24. The rear pair of cables 28 extend from the cable drum up around the pulleys 29 on the under side of the sills 1; thence up through the socket 17 and corner posts F and H to a dead end attached to the eye bracket 30 carried by the roof framing of the element B.

The front lowering cables 28 are similarly wound on the cable drums and carried up through the sills, the casings C' and D', and have their dead ends attached to the roof framing of the element B.

It is evident that when the crank handle 21 is turned in the proper direction, the cables 24 will be wound up and the cables 28 unwound, thus elevating the upper element B until the eye brackets 27 rise to the pulleys 26.

If, then, the crank handle be turned in the opposite direction, the cables 28 will be wound up and the cables 24 unwound, thus lowering the element B until it is telescoped down over the element A.

K represents the two side panels, which may be formed of flexible water proof material stretched over a rectangular frame 31 which is hinged along its upper edge to the roof structure, and which, when the top element B is telescoped down over the body element A, assume a vertical position between the roof and the sills, and between the casings D and D', thus closing in the sides of the vehicle. 23 is a plate or wooden rail against which the lower edge of the frame 31 rests.

The method of extending said panels K into the inclined positions shown in Fig. 2 will be explained later. When the vehicle body is being telescoped together, the panels K are drawn down into their vertical, closed positions, by means of the cables 32, indicated by line with dots in Fig. 13, whose outer ends are attached to the panels K at their lower corners and which are led up around the pulleys 33 mounted on the lower exteriors of the casings D and D' and whose dead ends are secured to the eye brackets 34 on the casings C and C'.

It is evident that the lowering of the top element B will shorten the cables 32, and thus draw the panels down snugly into their vertical positions. When the panels are raised, as shown in Fig. 2 they extend laterally at a downwardly inclined angle over the beds, being supported by the curtains which are hereinafter described.

L represents the two rectangular bed frames, one mounted at each side of the body element A. Said frames may be of any suitable character adapted to receive springs, mattresses and bed clothing, which, before the bed frames are turned up into their closed vertical positions, should be strapped or otherwise secured to the bed frames.

The ends of the bed frames are formed of the parallel plates 35 which are spaced apart and have clamped between them at their inner ends the legs 36, the bolts 35ª passing through the plates and said legs. The legs 36 are each formed of two pressed steel plates placed face to face, and provided with lateral edge flanges 36ª which engage the top edges and front ends of the plates 35, thus holding the legs rigid with the bed frames. The lower ends of the legs 36 are pivotally connected to brackets 36ᵇ secured to the floor.

The bed frames may be swung into the vertical positions shown in Fig. 1, or out into the horizontal positions shown in Fig. 2. The legs 36 move between the twin bars of the upwardly and outwardly inclined guide members 37. The lower ends of the guides 37 are bolted to the floor, and their upper ends are attached to the casings C and C' by the bolts 38, the guides being spaced from said housings by the sleeves 39 on said bolts. 40 are posts extending vertically from the sills 1 and having their upper ends notched to support the upper and outer ends of the guides 37. The posts 40 are bolted to the housings C and C', as shown at 41 with the bolts provided with interposed spacing sleeves 42. The posts 40 are provided with angular guide plates 43 which are slidably engaged by the angles 43ª of the upper casings D and D'. The posts 40 also act as a backing for the panels K when the latter are vertical. When the bed frames L are swung out into their horizontal or extended positions the legs 36 engage the outer ends of said guides, thus preventing said legs from swinging beyond the vertical, and supporting the bed frames in their horizontal positions.

The bed frames L are lowered into their horizontal or extended positions by means of the cables 44 whose inner ends are wound about the drums J and J' in the same directions as the winding of the cables 24, and which cables 44 are led up around the other pulleys 25 on the under side of the sills 1; thence up through holes in the latter; thence over pulleys 45 mounted on the sleeves 39; thence around one of a pair of freely rotating pulleys 46 journaled on the protruding ends of the bolts 35ª which clamp the legs to the bed frames, and the dead ends of said cables are attached to eye brackets 47 on the sleeves 42. The bed frames raising or closing cables 48 have their ends wound about the drums J and J' in a manner reverse to the windings of the cables 44 and similar to the windings of the cables 28. The cables 48 are led up through holes in the sills 1 and over the other pulleys 46 on the legs 35, thence through the eyes 50 on the floor, and have their dead ends attached to eye brackets 51 on the guides 37.

It is evident when the cable drums are rotated to raise the top element B, the cables 44 will be wound up and the cables 48 unwound, thus swinging the bed frames down and out from their vertical positions into their horizontal positions. When, however the cable drums are rotated in the proper direction to lower the top element B, the cables 48 are wound up and the cables 44 unwound, thus swinging the bed frames L from their horizontal positions upwardly and inwardly to their vertical or closed positions.

M represents drawers slidably mounted on the bed frames L so as to be positioned below the bed frames when the latter are horizontally extended, and to be positioned outside of the bed frames when the latter are vertically disposed. When the bed frames are horizontally extended said drawers may be opened by pulling them towards the center of the vehicle. Suitable catches are provided to lock the drawers against accidental movement relative to the bed frames.

N represents canvas curtains, one for each side, which curtains are attached at their tops to the roof structure back of the hinge of the panels K. Said curtains extend down inside of the panels K, and have their lower edges attached to the free longitudinal edges of the bed frames L, sufficient of the canvas material being provided so that the curtains may be extended as shown in Fig. 2, thus holding the panels K in the inclined position shown, and thereby completing the exterior inclosure of the extended bed frames. The cables 32 extend through suitable eyes in the curtains N.

The curtains N are thus extended, and the panels K held in their inclined position by strut bars 52 mounted at their ends on the long arms of the bent levers 53, which levers are pivoted to the ends of the bed frames and are connected by links 54 with a point 55 on the guides 37. Thus as the bed frames L are extended, the strut bars 52 are swung outwardly stretching the curtains N and raising the panels K into their inclined position. When the bed frames L are swung up into their vertical position the levers 53 and the strut bars 52 assume the position between the bed frames shown in Fig. 1. As the bed frames swing up into the vertical the canvas curtains are drawn in and folded out of the way to enable the panels K to assume their vertical position.

It is advantageous to support the vehicle body, when the same is made ready for occupancy, in a manner independent of the chassis. Thus I provide four downwardly extensible supporting legs O which are vertically slidable in depending sleeves 56 integral with the castings E and E' and in registering holes in the sills, so that said legs may be drawn up out of the way, protruding into the casings C and C'. The lower ends of the legs O are connected by a ball and socket joint with the foot plates 57, so that the legs will maintain a proper contact with the surface of the ground even though the latter may be uneven or inclined. The legs O are grooved circumferentially to form the upwardly facing annular shoulders 58 which are adapted to be engaged by the spring pressed latches 59 extending through slots 60 in the walls of the sleeves 56, so that the legs will be held against upward movement relative to the sleeves, or in other words the sleeves will be locked stationary on the legs when the latter have run down sufficiently to engage the ground.

The upper portions of the legs O are hollow to receive the sliding weights 61 which are attached to the ends of the cables 62, which cables extend up within the casings C and C' and over pulleys 63 mounted in the upper portions of said casings, and have their dead ends attached to the brackets 27 on the lower ends of the depending tubular posts H and H'. The upper ends of the legs are provided with inwardly extending stop pins 64 which prevent the weights 61 from rising out of the bores of the legs O.

It is evident that, as the element B is lowered in relation to the element A, the cables 62 will elevate the weights until they contact with the stop pins 64, provided the latches 59 are retracted, and the legs O will then be raised into the elevated position shown in Fig. 1.

When the vehicle is to be prepared for occupancy, the raising of the element B will allow the legs to drop until they gain firm support in contact with the ground, when they will be locked to the sleeves by the latches.

65 represents a back rest, comprised of a horizontal bar whose ends are attached to the supporting bars 66, which supporting bars are hinged to the upper ends of the bent levers 67 whose other ends are pivotally connected to the ends of the bars 68 fixed to the ends of the bed frames L. When the bed frames are extended horizontally the bent bars 67 may be turned outwardly to rest on the top edges of the end members of the bed frames L, and the bar 66 may be turned upwardly into alinement with the upper end of the bars 67a, the hinges being arranged to prevent further movement of the bars 66. Thus a back rest is formed for persons sitting on the edges of the bed frames. When not in use, as when the beds are to be used for sleeping, the back rest 65 and their supporting bars are turned down to the center of the body. When the bed frames are turned up into their vertical and closed position, the back rests and their supports occupy the intermediate position shown in dotted lines in Fig. 1.

I provide a collapsible table structure P, disposed longitudinally of the center of the element A, and which may be of the following construction.

68 represents a pair of spaced apart vertical posts, preferably iron pipe, having their bases firmly fixed to the floor as by being screwed into threaded sockets set in the floor. The upper ends of said posts are bent horizontally towards each other to form trunnions for the hinge collars 69 carried by the table leaves 70. Said table leaves are attached to their hinge collars in such a manner that, when the leaves are horizontal the adjacent edges of the leaves fit snugly together. When not extended, said leaves hang vertically from the post.

To support the leaves in their horizontal position, I provide a pair of pivotally mounted angular legs 71 for each post. The inner ends of the top arms of the legs are flattened so as to be pivotally connected by a bolt 72 to the lugs 73 of a collar 74 clamped about the post 68 near its top. The lower extremity of each leg is bent horizontally and flattened to be similarly pivoted by the bolt 75 to the horizontal lug 76 of the split collar 77 clamped about the lower portion of the legs 68. The legs are made of pipe about one half the size of the pipe of the post, so that the pairs of legs may be folded in together to permit the table leaves to be dropped into their vertical position.

The triangular front portion or nose of the element A may be provided at each side with cupboards or closets 78 closed by sliding doors 79, and between said cupboards I provide a horizontal shelf 80 under which may be placed a refrigerator 81, and upon which may be mounted the gas burners or hot plates 82. The front wall 9 of the top portion B may be provided with windows 83 to illuminate the housekeeping compartment when the element B is raised.

To enable the pawls 59 to be released or retracted when the legs O are to be raised simultaneously with the lowering of the top element and the retraction of the bed frames, I provided such pawls with eyes 84. The eyes 84 of each pair of pawls are connected by the links 85 with the opposite ends of rock levers 86 pivoted at 87 to the underside of the body portion A. The two rock levers 86 are provided with arms 88 connected to said levers at their axes, and said arms 88 are pivotally connected to the hand lever 89 disposed longitudinally of the vehicle and having its rear handled end protruding through the rear cross brace 19, as shown in Figs. 1 and 2. Thus, as the operator grasps the hand crank 21 to lower the top element and retract the bed frames, he pulls out the hand lever 89, thus unlocking the legs O, so that they may be simultaneously raised. The pawl 22 is connected with one of the rock levers 86, so that the winding mechanism is unlocked with the legs.

The drawers M are carried by the bed frames. One or more drawers may be carried by each bed frame.

Said drawers may be pressed from sheet metal, the upper sides of said drawers being hooked outwardly over and secured to the angle irons 90 whose horizontal flanges are cut away at the rear, as at 91, to provide clearance for the rollers 92 rotatably mounted on the protruding ends of the screw bolts 93 which extend through holes in the sides of the drawers and are screwed into and pinned rigidly in the threaded ends of a pipe or spreader 94 spanning the interior of the drawer.

95 represents a pair of rails of box form, supported underneath the bed frame and extending fore and aft thereof. The rear ends of said rails are supported by the brackets 96 secured to the rear members of the bed frame, while brackets 97, secured to the front members of the bed frame support the front ends of said rails. The rollers 92 run in the rails 95, as shown in Fig. 28. The front ends of the rails 95 are cut away below to give clearance for the rollers 98 rotatably mounted on pins 99 extending from the front brackets 97. The rollers 98 engage from below the horizontal flanges of the angle irons 90, as shown in Fig. 24. Thus rears of the drawers are supported by the traveling rollers 92, while the front support is by the fixed rollers 98.

Thus the drawers, although heavily burdened with contents will at all times slide freely.

The fronts of the drawers overlap upwardly the front members of the bed frames, thus limiting the inward movement of the drawers. The drawers may be locked shut by the spring locks 100 which may be unlocked by the usual key. 101 represents handles on the fronts of the drawers.

It is evident that the drawers may be filled, closed and locked when the bed frames are horizontal, and the bed frames may be then turned up into their vertical positions with the drawers carried on their outside.

It is evident from the foregoing that my improved vehicle body furnishes a complete auto-home which provides a most advantageous and complete touring accommodation.

One of its most striking advantages arises from the fact that the vehicle may be made ready for travel or occupancy in a very short time and with but little trouble, the raising or lowering of the top, the extension or retraction of the beds, the raising or lowering of the sides, and the extension or retraction of the supporting legs being accomplished by one and the same operation of the cable drums. Thus, when it comes time to camp, the auto-home may be made ready for occupancy in a moment, and even a child may do the work, as no unpacking and assemblage of parts is required. Likewise, in the morning, by one operation the auto-home is ready for travel.

An objection to camping vehicles of this sort has in the past been that too much time and effort were required to arrange the vehicle for occupancy and repack it for travel. Thus the custom of carting a complete camping outfit has obtained.

The cooking and food storing accommodations are of the greatest advantage, as they obviate the inconvenience and other objections of camp fire cooking, including the probability of fuel scarcity in many parts of the country.

When the top element B is telescoped the cables may be removed, the tubular posts and casings supporting the elements in proper relation.

By removing the bolts 1ª the body may be dismounted from the chassis and the latter prepared for other transportation purposes, as by mounting thereon a box or delivery body.

Although, for the sake of clearness in illustrating the principles of my invention I have described in detail the embodiment of the same shown in the drawings, I do not wish to limit myself thereby, but claim broadly:—

1. In a vehicle for the purposes described, the combination of a platform mounted on the running gear of the vehicle, a body element carried by said platform, a top element in telescopic relation to the body element and adapted to be raised and lowered in relation thereto, movable supports carried by the platform which may be lowered to engage the ground and support the body independently of the running gear and which may be raised out of engagement with the ground, and connections between said top element and said supports whereby when the top element is raised said supports are lowered into contact with the ground and when said top element is lowered said supports are raised out of contact with the ground.

2. In a vehicle for the purpose described, the combination of a platform mounted on the running gear of the vehicle, a body element carried by said platform, a top element in telescopic relation to the body element, connections for raising and lowering the top element relative to the body element, downwardly extensible supports carried by the platform which when extended engage the ground and support the body independently of the running gear, connections whereby when the top element is lowered said supports are upwardly retracted out of contact with the ground and when the top element is raised said supports are extended into contact with the ground, and means for locking said supports in their extended relation.

3. A corner construction for vehicle bodies comprised of a lower body element and an upper top element in telescopic relation thereto, consisting of an upwardly extending inclosed, hollow casing anchored to the body element and a downwardly extending casing anchored to the top element and telescoping down over said first mentioned casing.

4. A corner construction for vehicle bodies comprised of a lower body element and an upper top element in telescopic relation thereto, consisting of an upwardly extending casing anchored to the body portion, a downwardly extending casing anchored to the top element and telescoping down over said first mentioned casing, a post secured to said body portion and extending upwardly within said first mentioned casing, and a tubular post secured to the top portion and extending downwardly with said second mentioned casing and telescoping down over said first mentioned post.

5. In a vehicle for the purpose described, the combination of a body element adapted to be mounted on the running gear, a top element supported on and in telescopic relation to the body element, means for raising and lowering the top element relative to the body element, bed frames attached to and carried by the body element in such manner as to swing on horizontal axes, said bed frames when retracted being disposed vertically within the side lines of the body element and when extended being horizontally disposed and extending beyond said side lines, side panels hinged at their top edges to the top element and adapted, when the top element is lowered, to assume vertical positions closing in the sides of the telescoped body and, when the top element is raised, to be raised into its downwardly and outwardly inclined positions to form roofs above the extended bed frames, and means whereby the raising of the top element automatically extends said bed frames and raises said panels and the lowering of said top element retracts said bed frames and lowers said panels.

6. In a vehicle for the purpose described, the combination of a body element adapted to be mounted on the running gear, a top element supported on and in telescopic relation to the body element, means for raising and lowering the top element relative to the body element, bed frames attached to and carried by the body element in such manner as to swing on horizontal axes, said bed frames when retracted being disposed vertically within the side lines of the body element and when extended being horizontally disposed and extending beyond said side lines, side panels hinged at their top edges to the top element and adapted when the top element is lowered to assume vertical positions closing in the sides of the telescoped body and when the top element is raised to be raised into downwardly and outwardly inclined positions to form roofs above the extended bed frames, means whereby the raising of the top element automatically extends said bed frames and raises said panels and the lowering of said top element retracts said bed frames and lowers said panels, and flexible side curtains having their top edges attached to the body element inside of the panels and their bottom edges attached to the bed frames, said curtains being retracted inside of the side panels when the top element is lowered and being extended to form side inclosures for the bed frames when the latter are extended.

7. In a vehicle for the purpose described, the combination of a body element adapted to be mounted on the running gear, a top element supported on and in telescopic relation to the body element, means for raising and lowering the top element relative to the body element, bed frames attached to and carried by the body element in such manner as to swing on horizontal axes, said bed frames when retracted being disposed vertically within the side lines of the body element and when extended being horizontally disposed and extending beyond said side lines, side panels hinged at their top edges to the top element and adapted when the top element is lowered to assume vertical positions closing in the sides of the telescoped body and when the top element is raised to be raised into downwardly and outwardly inclined positions to form roofs above the extended bed frames, means whereby the raising of the top element automatically extends said bed frames and raises said panels and the lowering of said top element retracts said bed frames and lowers said panels, flexible side curtains having their top edges attached to the top element and their bottom edges attached to the bed frames, and means whereby when the top element is lowered said curtains are automatically folded within the side lines of the body element and concealed by the side panels and when the top element is raised said curtains are automatically extended to form lateral enclosures for the bed frames.

8. In a vehicle for the purpose described, the combination of a body element adapted to be mounted on the running gear, a pair of bed frames mounted on said body element to swing on horizontal axes, one of said bed frames being disposed on either side of the longitudinal axes of said body element, means whereby said bed frames may be turned up vertically within the side lines of said body element or be turned down to extend horizontally beyond said lines, storage drawers slidably mounted on said bed frames, said drawers being outside of said bed frames when the latter are vertical and beneath said bed frames when the latter are horizontal, access being had to said drawers from the interior of said body element when the bed frames are horizontally disposed, and means for locking said drawers against movement relative to said bed frames.

9. In a vehicle for the purposes described, the combination of a body element adapted to be mounted on the running gear, a pair of bed frames mounted on said body element to swing on horizontal axes so as to be either contracted within the side lines of said body element or to be extended in horizontal position beyond said side lines, and back rests associated with said bed frames and adapted to be swung into position above said bed frames when the latter are extended.

10. In a vehicle for the purposes described, the combination of a body element adapted to be mounted on the running gear, a pair of bed frames mounted on said body element to swing on horizontal axes, one of said bed frames being disposed on either side of the longitudinal axis of said body element, means whereby said bed frames may be turned up vertically within the side lines of said body element or be turned down to extend horizontally beyond said side lines, back rests associated with said bed frames and adapted to be moved into position above said bed frames when the latter are horizontal and moved into position between said bed frames when the latter are vertical.

11. In a vehicle for the purposes described, the combination of a body element adapted to be mounted on the running gear, a pair of bed frames mounted on said body element to swing on horizontal axes, one of said bed frames being disposed at either side of the longitudinal axis of said body element, means whereby said bed frames may be turned up vertically between the side lines of said body element or be turned down to extend horizontally beyond said side lines, flexible side curtains, and stretcher means operating with said bed frames for extending said curtains laterally to form top and side inclosures for said bed frames when the latter are extended horizontally.

12. In a vehicle for the purposes described, the combination of a body element adapted to be mounted on the running gear, a top element in telescopic relation to said body element, a pair of bed frames mounted on said body element to swing on horizontal axes, one of said bed frames being disposed on either side of the longitudinal axis of said body element, means whereby when said top element is lowered said frames are turned up vertically within the side lines of the body element and when said top element is raised said bed frames are turned down to extend horizontally beyond said side lines, flexible side curtains attached at their tops to said top element and at their bottoms to said body element, side panels hinged at their tops to the top element and disposed outside of said curtains, means whereby said side panels are drawn down into vertical positions when said top element is lowered, and stretcher means operating with said bed frames to extend said curtains laterally and raise said panels into an outwardly extended position when said bed frames are extended.

13. In a vehicle for the purpose described, the combination of a body element adapted to be mounted on the running gear, a top element in telescopic relation to said body element, bed frames mounted on said body element and adapted to be retracted within the side lines of the latter and to be extended for occupancy laterally beyond said side lines, supporting legs adapted to extend downwardly to engage the ground to support the vehicle body when ready for occupancy and to be raised out of contact with the ground when the vehicle is ready for travel, cables for raising and lowering said top element, for extending and retracting said bed frames and for raising said legs, and a unitary winding means, the cables for raising said top element and for extending said bed frames being wound in the same directions on said winding means, while the cables for lowering said top element, for retracting said bed frames and for raising said legs are wound in the other directions on said winding means, whereby when said winding means is operated in the one direction the top element is raised, the bed frames are extended, and when the winding means is operated in the other direction the top element is lowered, the bed frames are retracted and the legs are raised.

14. In a vehicle for the purposes described, the combination of a body element adapted to be mounted on the running gear, a top element in telescopic relation to said body element, means for raising and lowering said top element relative to said body element, flexible side curtains having their top edges permanently attached to the top element and their bottom edges permanently attached to the body element, and means whereby when said top element is lowered said curtains are automatically folded and retracted inwardly to within the side lines of the body element and when the top element is raised said curtains are automatically extended laterally beyond said side lines.

15. In a vehicle for the purposes described, the combination of a body element adapted to be mounted on the running gear, a top element in telescopic relation to said body element, means for raising and lowering said top element relative to said body element, flexible side curtains having their top edges permanently attached to the top element and their bottom edges permanently attached to the body element, means whereby said curtains are automatically folded and retracted inwardly to within the side lines of the body element when said top element is lowered, and swinging stretcher means which are automatically operated by the raising of the top element to extend said curtains laterally beyond said side lines.

16. In a vehicle for the purposes described, the combination of a body element adapted to be mounted on the running gear, a top element in telescopic relation to said body element, means for raising and lowering the top element relative to the body element, bed frames movably mounted on horizontal axes on said body element, means whereby when the top element is lowered said bed frames are automatically turned up into vertical positions within the body element and when said top element is raised said bed frames are turned into horizontal positions extending beyond the sides of said body element, flexible side curtains having their top edges attached to the top element and their bottom edges attached to said bed frames, and means automatically operated by the raising and lowering of said top element for extending said curtains laterally to form enclosures for the bed frames when the latter are in horizontal positions and for folding and retracting said curtains within the body element when the bed frames are turned up vertically.

17. In a vehicle body for the purposes described, the combination of a body element mounted on the running gear, a top element in telescopic relation therewith, means for raising and lowering the top element relative to the bottom element, flexible side curtains having their tops attached to the top element and having their bottoms secured in the body element, means operated by the elevation of the top element whereby said side curtains are automatically extended outwardly to form lateral extensions of the body, and side panels outside of said curtains hinged at their tops to the top element, said panels hanging vertically when the top element is lowered to form side inclosures for the body but being swung upwardly into and supported in an outwardly inclined position by the extension of said curtains when the top element is raised.

18. In a vehicle body for the purpose described, the combination of a body element mounted on the running gear, a top element in telescopic relation with the body element, means for raising and lowering the top element relative to the body element, flexible side curtains having their top edges attached to the top element and their bottom edges attached to the body element, means actuated by the raising of the top element whereby the intermediate portions of said curtains are extended outwardly to form lateral extensions communicating with the interior of the body, and side panels having their top edges hingedly attached to the top elements outside of said curtains, said panels hanging vertically when said top element is lowered thus forming the side closure of the body and said panels being forced upwardly into an inclined position and being supported by the side curtains when the latter are extended.

19. In a vehicle body for the purpose described, the combination of a body element mounted on the running gear, a top element in telescopic relation with the body element, means for raising and lowering the top element relative to the body element, flexible side curtains having their top edges attached to the top element and their bottom edges attached to the body element, means actuated by the raising of the top element whereby the intermediate portions of said curtains are extended outwardly to form lateral extensions communicating with the interior of the body, and side panels having their top edges hingedly attached to the top elements outside of said curtains, said panels being forced upwardly into an inclined position when the side curtains are extended, and operative connection between said panels and the top element whereby when the latter is lowered said panels are drawn down into a vertical position to form the side closures of the body.

20. In a vehicle body for the purpose described, the combination of a body element mounted on the running gear, a top element in telescopic relation with the body element, means for raising and lowering the top element relative to the body element, flexible side curtains having their top edges attached to the top element and their bottom edges attached to the body element, means actuated by the raising of the top element whereby the intermediate portions of said curtains are extended outwardly to form lateral extensions communicating with the interior of the body, and side panels having their top edges hingedly attached to the top elements outside of said curtains, said panels being forced upwardly into an inclined position when the side curtains are extended, and cables connecting said panels and said top element whereby when the top element is lowered said panels are drawn down into a vertical position to form the side closures of the body.

21. In a vehicle body, the combination of a bed frame mounted on said body and adapted to be swung into a vertical, retracted position or into a horizontal, extended position, legs having their upper ends secured to said bed frame and their lower ends pivotally attached to the vehicle body whereby said bed frame may be retracted or extended, and slotted guides in which said legs work, said guides being provided at one end with abutments against which said legs bear to support the frame in its horizontally extended position.

22. In a vehicle for the purpose described, the combination of a body element adapted to be mounted on the running gear of the vehicle, a top element in telescopic relation to the body element, means for raising and lowering the top element relative to the body element, a pair of bed frames mounted on said body element to swing on horizontal axes and disposed on either side of the longitudinal center line of the vehicle, means actuated by the lowering of the top element for swinging said bed frames into vertical positions within the side lines of the body element and actuated by the raising of the top element for swinging said bed frames into horizontal positions extending beyond said side lines, flexible side curtains permanently attached at their top edges to said top element and permanently attached at their bottom edges directly to said bed frames, and stretcher means actuated by the raising of the top element and engaging the side curtains to extend the same laterally beyond the side lines of the body element to form top and side enclosures for the bed frames.

23. In a vehicle for the purpose described, the combination of a body element adapted to be mounted on the running gear of the vehicle, a top element in telescopic relation to the body element, means for raising and lowering the top element relative to the body element, a pair of bed frames mounted on said body element to swing on horizontal axes and disposed on either side of the longitudinal center line of the vehicle, means actuated by the lowering of the top element for swinging said bed frames into vertical positions within the side lines of the body element and actuated by the raising of the top element for swinging said bed frames into horizontal positions extending beyond said side lines, flexible side curtains permanently attached at their top edges to said top element and permanently attached at their bottom edges directly to said bed frames, stretcher means actuated by the raising of the top element and engaging the side curtains to extend the same laterally beyond the side lines of the body element to form top and side enclosures for the bed frames, and side panels hingedly connected to the top element outside of said curtains, said panels being disposed vertically and forming side closures when the top element is lowered and being raised upwardly into outwardly inclined positions when the top element is raised.

Signed at Cuyahoga Falls, Ohio, this 15 day of Feb., 1923.

ALBERT H. KLESA.